US006349194B1

(12) United States Patent
Nozaki et al.

(10) Patent No.: US 6,349,194 B1
(45) Date of Patent: Feb. 19, 2002

(54) ORDER RECEIVING METHOD AND APPARATUS FOR MAKING SOUND-ACCOMPANYING PHOTOGRAPHS

(75) Inventors: Iwao Nozaki; Yasuyuki Hashimoto, both of Wakayama; Shinichi Imade, Tokyo, all of (JP)

(73) Assignees: Noritsu Koki Co., Ltd., Wakayama-ken; Olympus Optical Co., Ltd., Tokyo, both of (JP)

( * ) Notice: Subject to any disclaimer, the term of this patent is extended or adjusted under 35 U.S.C. 154(b) by 0 days.

(21) Appl. No.: 09/304,889

(22) Filed: May 4, 1999

(30) Foreign Application Priority Data

Jun. 8, 1998 (JP) .......................................... 10-159612

(51) Int. Cl.[7] ................................................ G09B 5/00
(52) U.S. Cl. ....................................... 434/308; 434/309
(58) Field of Search ................................ 434/308, 309, 434/311, 314–320; 700/87, 94, 215, 216, 221, 224–227, 236; 705/27; 708/172; 40/124.03, 457, 717; 396/312

(56) References Cited

U.S. PATENT DOCUMENTS

| | | | | |
|---|---|---|---|---|
| 5,276,472 A | | 1/1994 | Bell et al. | |
| 5,644,557 A | | 7/1997 | Akamine et al. | |
| 5,650,826 A | | 7/1997 | Eitz | |
| 5,666,215 A | | 9/1997 | Fredlund et al. | |
| 6,147,742 A | * | 11/2000 | Bell et al. | 355/27 |
| 6,154,295 A | * | 11/2000 | Fredlund et al. | 358/487 |
| 6,163,656 A | * | 12/2000 | Yoshioka | 396/429 |

FOREIGN PATENT DOCUMENTS

| | | |
|---|---|---|
| EP | 0825777 | 2/1998 |

* cited by examiner

*Primary Examiner*—John Edmund Rovnak
(74) *Attorney, Agent, or Firm*—Fulbright & Jaworski LLP

(57) ABSTRACT

An order receiving apparatus (1) for making sound-accompanying photographs having, recorded thereon, image information, and audio information converted into code images to be optically readable. This apparatus includes an audio input unit (22) for receiving audio information from a customer, an image input unit (23) for receiving image information, a layout editor (12) for designating recording regions on a sound-accompanying photograph to be made, to record the image information and audio information, and an order information output unit (26) for outputting the image information and audio information as order information and as linked to the recording regions designated.

16 Claims, 9 Drawing Sheets

ORDER INFORMATION

Date of receipt : 99/04/01
No.of receipt : 1233562
Name: 能率 太郎
Telephone: 0734-56-0000
Scheduled Date of Finish: 99/04/03
Receptionist: Nishimoto
Images Received: negative

VOUCHER

Fig.4

VOUCHER

FOR CUSTOMER`S KEEPING

Date of receipt : 99/04/01
No.of receipt : 1233562
Name: 能率 太郎
Telephone: 0734-56-0000
Scheduled Date of Finish: 99/04/03
Agent : Noritz → Sound Phote1&
Sound Phote2

Fig.5

VOUCHER

ORDER & FOR CUSTOMER`S KEEPING

Date of receipt : 99/04/01
No.of receipt : 1233562
Name: 能率 太郎
Telephone: 0734-56-0000
Scheduled Date of Finish: 99/04/03
Agent : Noritz
Process : sound photos 2types
Images Received : negative 1 strip Audio ID=0122 AA 11 Audio ID=0122 AA 12
Image ID=0122 AA 1A Image ID=0122 AA 1B
Audio ID=0122 AB 21 Audio ID=0122 AB 22
Audio ID=0122 AB 2A Audio ID=0122 AB 2B

| | | | | |
|---|---|---|---|---|
| audio ID | order ID | template ID | process ID | audio No. |
| image ID | order ID | template ID | process ID | image No. |

| | | |
|---|---|---|
| audio data with ID | audio ID | audio data |
| image data with ID | image ID | image data |

Fig.12 date of receipt: ____________________

Name: ____________________

Telephone: ____________________

Check No.(Check Label) ____________________

*Check No.(check Label) is shown also on product packet.

Original Received: negative( 1 ) print(s) ( ) other( )

*Negative(s) in one negative pocket is/are regarded as 1

Audio Received: cassette tape ( 1 ) FD ( ) other( )

| Process No. | Template ID | Frame No. (comp.posit.) | | | Size | Qty | Audio Inf. (enter head parts) | | Note |
|---|---|---|---|---|---|---|---|---|---|
| | | A | B | C | | | A | B | |
| 1 | SP0001 | 2 | 18 | | 1/4 | 1 | conversation | message | |
| 2 | | | | | | | | | |
| 3 | | | | | | | | | |

Order for Free Remarks (Some types of remarks cannot be entered.)

| Process No. | Free Remarks |
|---|---|
| 1 | We have married |
| 2 | |
| 3 | |

Sound Photo Templates

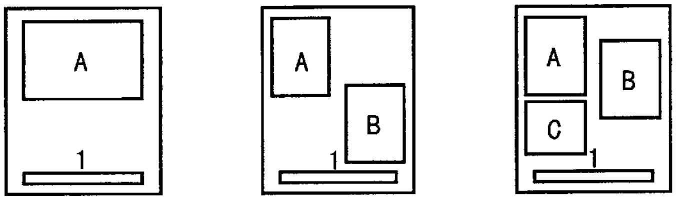

SP0001 SP0002 SP0003

Sound Photo Album Templates

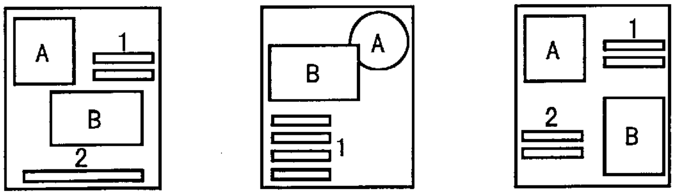

A_SP0001 B_SP0002 C_SP0003

ORDER RECEIVING METHOD AND APPARATUS FOR MAKING SOUND-ACCOMPANYING PHOTOGRAPHS

BACKGROUND OF THE INVENTION

This invention relates to order receiving methods and apparatus for making sound-accompanying photographs with image information and audio information recorded thereon, the latter being in the form of optically readable code images.

DESCRIPTION OF THE RELATED ART

Images photographed with various image acquiring devices are printed on printing paper by the silver salt photographic method, or on paper or film by using an ink jet printer, thermal printer or the like. Thus, over long years, information on photographic objects has been transmitted in the form of still images relying on the sense of sight across wide areas and in a timeless way. Recently, with the advent of the multimedia age, vigorous attempts have been made to use the sense of hearing in the transmission of information, instead of relying solely on the sense of sight. Olympus Optical Co., Ltd., which is one of the joint applicants in this application, also has proposed new media for providing not only visible but audible information in Japanese Patent Laying-Open Publication H6-231466 and Japanese Patent Laying-Open Publication H7-181606, for example. According to this technique, recording media include sound converted into optically readable dot codes (audio code images) which are printed along with pictures, photographs or characters on the same paper, the dot codes being read with a special scanner.

By using these new media, what is known as sound-accompanying photographs may be made (the photographs, herein, being not limited to conventional photo images, but including images obtained with various image acquiring devices). Such a photograph has an image or images obtained by the conventional technique and an optically readable code image or images as noted above which are laid out on a sheet of paper.

A sound-accompanying photograph may be made, for example, by recording animal cries on animal photographs, or recording voices of a plurality of people on a snapshot of these people simultaneously with or after the photo taking. Such a photograph may have a layout of a plurality of image information (still images such as photographs) and a plurality of audio information. What is important here is to associate image information and audio information accurately and determine a layout as desired by the customer. Particularly at an order receiving station such as a processing agent's shop which is a point of contact between the customer and photo processing site, care must be taken in receiving an order for sound-accompanying photographs not to mislink image information and audio information.

SUMMARY OF THE INVENTION

An object of this invention is to provide a technique, i.e. an order receiving method and apparatus, for reliably registering, at an order receiving stage, information important in making sound-accompanying photographs each having a picture image or images and an optically readable audio code image or images laid out on a single sheet, the picture image or images being obtained with a silver salt type camera, a digital still camera for handling image data, an image reading scanner or the like.

The above object is fulfilled, according to this invention, by an order receiving method for making sound-accompanying photographs having, recorded thereon, image information, and audio information converted into code images to be optically readable, the method comprising the steps of receiving audio information and image information from a customer, designating recording regions on a sound-accompanying photograph to be made, for recording the image information and the audio information, and registering the image information and the audio information as order information and as linked to the recording regions designated.

In another aspect of the invention, an order receiving apparatus is provided for making sound-accompanying photographs having, recorded thereon, image information, and audio information converted into code images to be optically readable. This apparatus comprises a receiving unit for receiving audio information and image information from a customer, a recording region designating unit for designating recording regions on a sound-accompanying photograph to be made, for recording the image information and the audio information, and an order information registering unit for registering the image information and the audio information as order information and as linked to the recording regions designated.

In these techniques, audio information and image information received are linked to recording regions designated therefor, respectively, and are registered as order information. Thus, the audio information and image information may be checked anytime during the subsequent process of making sound-accompanying photographs. With the registered order information confirmed by the customer, there will occur no trouble between the customer and receptionist.

In a preferred embodiment of this invention, the recording regions are determined beforehand with recording region identification signs (e.g. ID codes or just names) applied thereto. Even when one sound-accompanying photograph has a plurality of audio recording regions and image recording regions, and even when a change is made in the positional relationship of these recording regions, a desired region may be identified among the plurality of recording regions with the help of the identification signs. An image identification sign and an audio identification sign may be applied also to the image information and the audio information received, respectively. Then, the designated recording regions may be related to the image information and audio information in a simple way with the identification signs serving as a key. Further, a customer identification sign may be applied to the image information and audio information. This will preclude the possibility of confusing the image information and audio information received from one customer with the information received from another. Even so, where the same customer orders a plurality of sound-accompanying photographs at the same time, image information and audio information intended for one photograph could inadvertently be used for another. This inconvenience is avoided by applying a print identification sign indicating each sound-accompanying photograph to be made to the image information and audio information received.

In another preferred embodiment of this invention, the order information is displayed on a monitor for checking whether the order information to be registered is correct. In this way, an allocation and layout of image information and audio information to/in the recording regions may be confirmed easily, which precludes an order-related trouble occurring between the customer and receptionist. For confirming such order information, not only the monitor screen but a hard copy of the order information such as a voucher printout may of course be used.

The order information may be recorded on the voucher in a form readable by an optical reader such as a card reader, bar-code reader, mark sheet reader or the like. It is then possible to display the order information or input it to a sound-accompanying photograph making apparatus at any time.

In an order receiving apparatus according to a further preferred embodiment of this invention, the recording region designating unit is operable to designate the recording regions based on a template selected from a template library. Instead of preparing a layout of the sound-accompanying photograph from scratch, a layout may be selected from a library storing numerous layout examples in the form of templates. This expedites an order receiving operation.

In a further embodiment, the recording region designating unit has a function to designate the recording regions based on position coordinates inputted. With this construction, shapes of the recording regions may determined and the regions may be arranged accurately when preparing the regions from scratch.

When a designated recording region has an area disagreeing with an area required by audio information made into a code image, the designated region must be altered in making a sound-accompanying photograph. To avoid such a situation, the recording region designating unit in a preferred embodiment of this invention has a function to redesignate the audio recording region with reference to a volume of the audio information converted into a code image. The volume, i.e. the area required by the audio information made into a code image, is derived from a suitable look-up table or a device for electronically calculating the area from the audio information received.

The foregoing object is fulfilled, according to this invention, by a different order receiving apparatus for making sound-accompanying photographs having, recorded thereon, image information, and audio information converted into code images to be optically readable. This apparatus comprises a receiving unit for receiving customer information, audio information and image information from a customer, a layout edit unit for designating an image recording region and an audio recording region in a recording area of a sound-accompanying photograph to be made, and linking the image information with the image recording region and the audio information with the audio recording region, and an order information output unit for outputting order information including layout information indicative of a layout edited and the customer information. This apparatus is constructed to perform the above-mentioned order receiving operation electronically by using various electronic devices. The layout edit unit designates an image recording region and an audio recording region, and links the image information and audio information with the recording regions. The results of editing work are outputted as order information, along with the customer information, in the form of a printout or a file, or transmitted to a predetermined location through a LAN or WAN. This realizes mechanization of the order receiving operation, especially flexible sound-accompanying photographic artwork based on the layout edit unit used in time of receiving orders.

To make such sound-accompanying photographic artwork, i.e. to carry out a design operation, with enhanced perfection, the layout edit unit in a preferred embodiment of this invention has a region size priority mode for setting a compression parameter for use in converting the audio information into a code image to fit into a size of the audio recording region, and an audio quality priority mode for adjusting the audio recording region to accommodate a volume of the audio information converted into the code image. With this construction, the customer is asked to determine which is the most important among the quality of sound, length of sound and the entire design, and a layout of the sound-accompanying photograph may be produced in a way to meet the customer's requirement. For this purpose, the layout edit unit may include an audio volume calculator for calculating the volume of the audio information converted into the code image, and a recording region altering device for altering the audio recording region according to the volume calculated. This construction automates the layout operation to a considerable degree. When enlarging the audio recording region, the recording region altering device may split the audio recording region into a plurality of stages instead of simply enlarging the region. Then, the audio recording region may easily be placed in a suitable location, e.g. a location not overlapping an important image region.

From the viewpoint of the artwork of sound-accompanying photographs, and from the viewpoint of scanning and reading audio code images, an attribute value setting unit may be provided for setting attribute values (background color, code image color, the thickness and color of frame lines and so on) to the audio recording region for making the sound-accompanying photograph. This is important in realizing sound-accompanying photographs with advantages in practical use, visual quality and audio reproduction.

In a further preferred embodiment of this invention, the order information output unit is operable to output the order information along with the image information and the audio information by using a source mixed type page description language. The order information outputted integrates all materials essential for making sound-accompanying photographs. The information outputted is inputted as it is to a sound-accompanying photograph making apparatus generally through a storage medium such as an MO or through a communication medium. As a different page description language, a markup type page description language may be used to output the order information separately from the image information and audio information. The markup language is highly compatible with the Internet, and is convenient for communication. Of course, the order information output unit may output the order information, image information and audio information to a plurality of media. It is important to meet requirements of a sound-accompanying photograph making lab acting as an output center, and to enable issuing of vouchers serving as order receipts given to customers.

As will be understood from the foregoing description, the method of receiving an order for sound-accompanying photographs according to this invention may advantageously be executed on a computer system employing page layout software appropriately developed for generalpurpose computers. More particularly, the invention proposes an order receiving method for making, by using a computer system, order information relating to an order for sound-accompanying photographs having, recorded thereon, image information, and audio information converted into code images to be optically readable. This method comprises the steps of setting a virtual page corresponding to one sound-accompanying photograph, setting to the page an image recording region for the image information and an audio recording region for the audio information, linking the image information and the audio information to the recording regions, applying provisionally the image information and the audio information linked, to the recording regions, adjusting a volume of the information applied and/or a size of the recording regions linked, when a size required by the information applied disagrees with the size of the recording regions, and outputting a completed page design as the order information by using a page description language. In this method, the audio information and image information inputted to the computer are treated as materials for a page layout where an entire sound-accompanying photograph to be made is regarded as one page. Information recording regions are created on a monitor screen, and the materials are applied to these recording regions. In this way, the recording regions linked to the audio information and image information are designed. A completed page design is outputted in a page description language as noted hereinbefore, and transmitted to a sound-accompanying photograph making lab through some medium. Thus, only a simple system is required to achieve a very creative designing of sound-accompanying photographs, and an accurate transmission of page layout information to the sound-accompanying photograph making lab. To realize the accurate transmission of page layout information with enhanced perfection, it is important that the order information outputted includes a compression parameter for use in converting the audio information into a code image.

In this computer system also, the recording regions may be selected and set by accessing a template library storing a plurality of templates providing designs and arrangements of the recording regions. Then, designs above the average may be provided at any order receiving station.

Other features and the advantages of this invention will be apparent from the following description of embodiments to be taken with reference to the drawings.

BRIEF DESCRIPTION OF THE DRAWINGS

FIG. 4 is an explanatory view showing another example of vouchers;

FIG. 5 is an explanatory view showing a further example of vouchers;

FIG. 12 is an explanatory view showing one example of order forms; and

DESCRIPTION OF THE PREFERRED EMBODIMENTS

Figure 1:
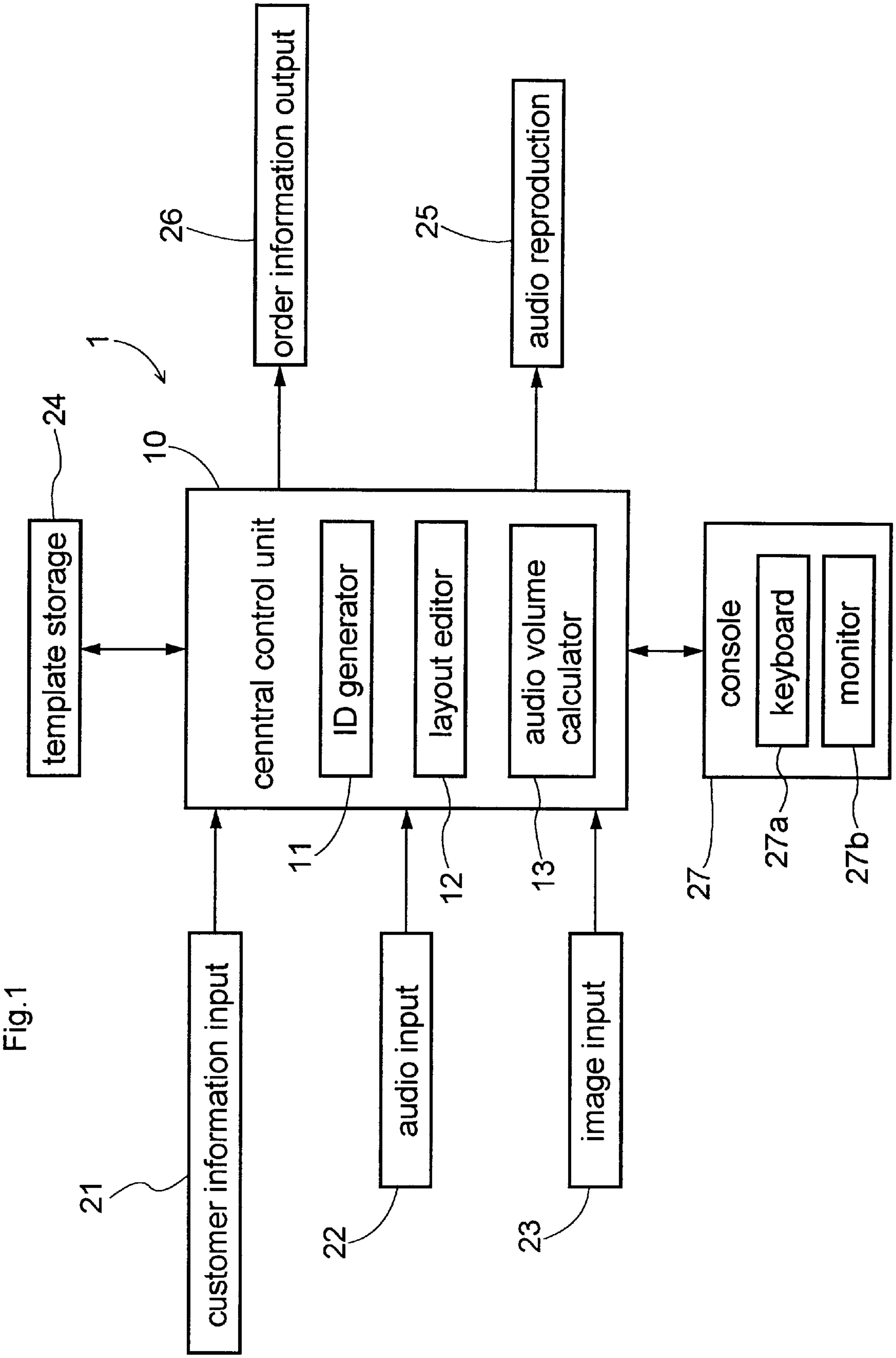
FIG. 1 is a block diagram showing one example of apparatus for receiving orders for sound-accompanying photographs according to this invention.

FIG. 1 schematically shows, in block diagram, one example of order receiving apparatus according to this invention. This apparatus 1 is installed at a photo processing agent's for assisting in reception of orders for sound-accompanying photographs with image information, and audio information in the form of optically readable coded images. The receiving apparatus 1 has a central control unit 10 for performing various functions based substantially on computer programs, and various peripheral functional units. These peripheral units include a customer information input unit 21, an audio input unit 22, an image input unit 23, a template storage 24, an audio reproduction unit 25 and an order information output unit 26. Further, a console 27 is provided which includes a keyboard 27*a* for inputting commands to the central control unit 10, and a monitor 27*b* for monitoring processes being carried out.

Figures 2, 3:
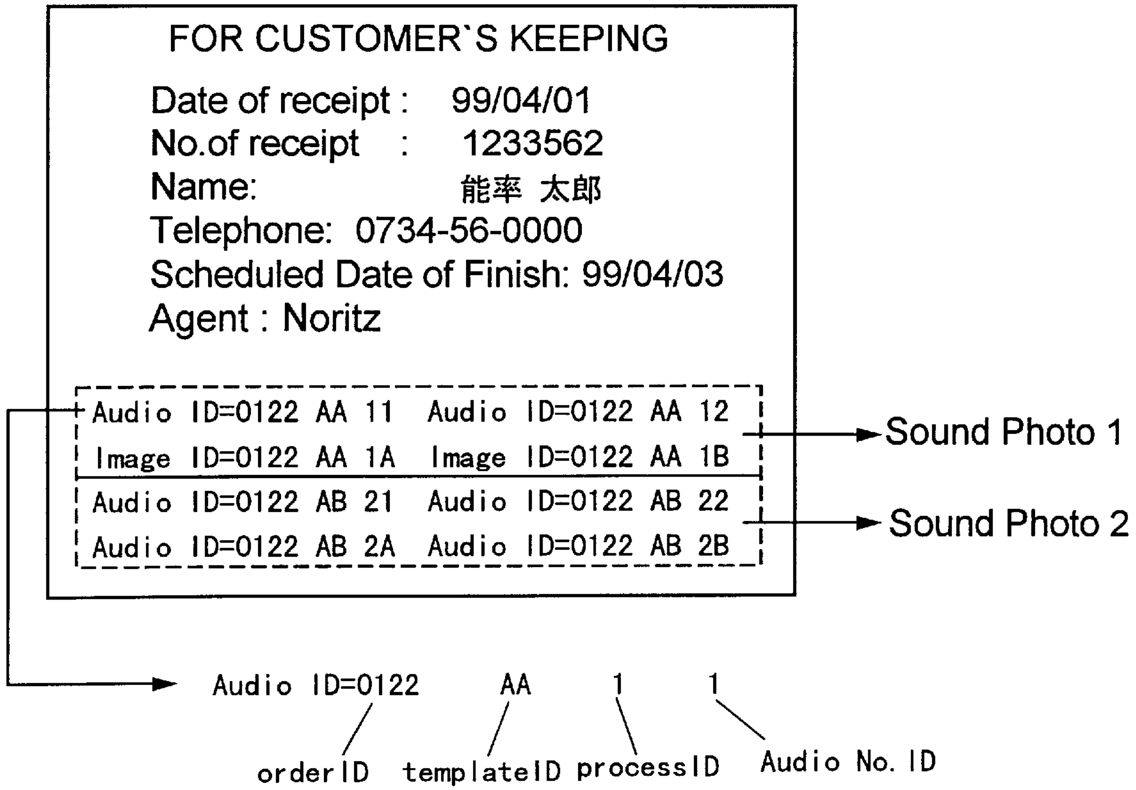
FIG. 2 is an explanatory view showing one example of order information.
FIG. 3 is an explanatory view showing one example of vouchers.

The customer information input unit 21 is operable to input personal information, e.g. names, addresses and telephone numbers, of customers ordering sound-accompanying photographs. The input unit 21 may take different forms at different shops. At a shop which gives customer cards to the customers, customer information may be inputted easily through a card reader. When a customer is a large user or a secondary processing agent, a particular bar code may be allocated to the customer to simplify input with a bar-code reader. In any case, it is desirable to keep a customer database at the shop, from which to derive a large amount of customer information including an order history based on customer numbers acquired from the card or bar code. It is of course possible to input, directly by operating the keyboard 27*a*, customer information given verbally or by means of an order slip filled in by the customer. It is also effective to use a mark sheet type order slip and a mark sheet reader in order to check errors in inputting customer information. FIG. 2 shows a typical example of order information including customer information. The term customer information input unit 21 is used as a generic name for such various devices used to input customer information and order information.

The audio input unit 22 is operable to input audio information to be recorded on the sound-accompanying photographs ordered by customers, and must cope with various media brought in by the customers. Further, the customers may input messages directly through a microphone connected to the receiving apparatus 1, or may designate sound selected from an audio library available at the shop. Media employed include storage media such as a cassette tape, MD and CD, and communication media such as the Internet. When analog audio information is brought in, it has to be digitized by suitable analog-to-digital conversion. The term audio input unit 22 is used herein as a generic name for audio input devices needed to input audio information directly or indirectly through the various media noted above.

The image input unit 23 is operable to input image information to be recorded on the sound-accompanying photographs ordered by customers, and uses media basically similar to those used by the audio input unit 22. The most familiar mode is to scan and digitize photographs or print outputs brought in by customers. Instead of inputting audio information or image information to the audio input unit 22 or image input unit 23, only the name or the like identifying the source may be inputted through the console 27, with the source just transmitted to a photograph processing site. In this case, the console 27 acts as a device for receiving audio information and image information. Thus, the device for receiving audio information and image information includes the audio input unit 22, image input unit 23 and console 27.

The template storage 24 stores various layouts for sound-accompanying photographs in the form of templates. Each template has a particular design, shape and arrangement of an audio recording region and image recording region. Each template has a template ID applied thereto for identification. The design of each template, with a varied shape and arrangement, has a design ID applied thereto. Each template ID is linked with the design ID identifying the template design, and with a format ID defining the number, size and so on of sounds and images to be recorded in the regions. Thus, necessary incidental information is obtained easily from the template ID. A preferred form of template storage 24 includes an electronic storage medium such as a CD-ROM, MO or HD (hard disk), and a system having an interface for displaying its contents on the monitor for selection. In such an electronic storage medium, the data structure may include a template number, template ID, design ID, format ID, and simple bit map data for browsing purposes. It is also possible to employ a catalog form printed on paper and filed. In that case, a customer may input the template ID of a template selected from the catalog, whereby the central control unit 10 reads the template. The term template storage 24 is used as a generic name for template storage systems including electronic files and the paper files.

In processing order information at the receiving apparatus 1, the monitor 27*b* is used to check acceptability of the impression of an entire layout and the allocation of image information and audio information to the respective recording regions. Since audio information cannot be checked visually, the audio reproduction unit 25 is used to cause the sound to be heard through a loudspeaker.

The order information output unit 26 has a function to issue exchange tickets or vouchers to be handed, after completion of an order receiving process, to customers having ordered sound-accompanying photographs. Examples of vouchers are shown in FIGS. 3 and 4. The voucher shown in FIG. 3 includes audio IDs and image IDs below customer information and an agent's name. These are identification signs of audio information and image information used for sound-accompanying photographs, which will be described in detail hereinafter. This voucher is for two types of sound-accompanying photographs (sound-accompanying photograph No. 1 and sound-accompanying photograph No. 2). The voucher shown in FIG. 4 includes, in place of the audio IDs and image IDs, a mechanically readable code converted from customer information and audio and image IDs. The code may be in the form of an ordinary bar code or two-dimensional bar code, or a special code used for sound-accompanying photographs.

The processing agent puts the voucher in a product packet, attaches it to the packet, or has it directly printed on the packet. To use the voucher in receiving a re-order, order information may also be printed in the form of characters or code as shown in FIG. 5. When plural types of sound-accompanying photographs are ordered by the same customer at the same time, a voucher may be issued for each sound-accompanying photograph.

The central control unit 10 which controls the receiving process, and especially a layout process will be described next. The central control unit 10 includes an ID generator 11 for issuing an order ID for each order, an audio ID for audio information inputted from the audio input unit 22 and an image ID for image information inputted from the image input unit 23, a layout editor 12 for designating an audio recording region and an image recording region based on a template selected from the template storage 24, and linking the corresponding audio ID and image ID with the respective regions, and an audio volume calculator 13 for calculating a volume (corresponding to a required region size) of the audio information inputted and made into a code image.

The audio volume calculator 13 has a specific construction variable with a method of converting audio information into a coded image. Where an optically readable dot code (audio code image) method is employed as proposed in Japanese Patent Laying-Open Publication H6-231466, for example, a construction as disclosed in Japanese Patent Laying-Open Publication H10-51645 in the name of Olympus Optical Co., Ltd. which is one of the joint applicants in this application may be employed. This construction determines a volume of audio information made into a code image in a simple way by calculating a data amount after the audio information is compressed into a code, and generating a pre-code image data from this data amount. More simply, a table may be prepared of region sizes required by code images from inputted audio information for each predetermined compression parameter, so that a size of an audio recording region may be obtained only by selecting a compression parameter.

The layout editor 12 has a recording region altering function for altering the position or size of each recording region based on a command inputted by the operator through the console 27, and automatically varying the size of the audio recording region according to a required region size determined by the audio volume calculator 13. The compression parameter for converting audio information into a code image is usually fixed. However, the compression parameter may be varied as necessary to adjust the length of sound allocated to numerous identical audio regions. For this purpose, the layout editor 12 can process such a compression parameter as an attribute value of the audio recording region. Thus, the receiving apparatus 1 selects between a region size priority mode to set a compression parameter for making audio information into an image code to agree with the size of the audio recording region, and an audio quality priority mode to adjust the audio recording region to accommodate a volume of audio information made into a code image. Other attribute values are background color and color for recording a code image. Operations therefor are performed by a combination of commands from the console 27 and the layout editor 12.

The layout editor 12 acts also as an order information recording device for recording, as order information, image information and audio information as associated with designated recording regions. The order information, including layout information, processed by the layout editor 12 as described above includes all information necessary to produce each sound-accompanying photograph. The order information is outputted from the order information output unit 26 in the form of an electronic file made by using a special page description language and usually stored on a MO, CD-R or the like. This is done for convenience of transmitting the information to an apparatus for making sound-accompanying photographs or an output service center or processing lab having such an apparatus. The order information output unit 26, of course, also prints out a voucher to be handed to the customer, and, as necessary, an order sheet to be passed to an actual sound-accompanying photograph processing site. Thus, the order information output unit 26 should be understood as a collective term for an electronic file generating device and a printer.

The page description language noted above may be similar to what is called PostScript (a trademark of Adobe Systems, Inc., U.S.A.) for describing layout information to make sound-accompanying photographs, audio information and image information to be recorded in the recording regions on layout, and various attribute values, or may be similar to SGML (Standard Generalized Markup Language) for only linking layout information, and audio information and image information to be recorded in the recording regions on layout and making separate files. The receiving apparatus 1 may transmit the electronic file made by using the above page description language, directly to the apparatus for processing sound-accompanying photographs or the processing lab having such an apparatus, provided that the two parties are connected through a public switched line, LAN or WAN.

Figure 6:
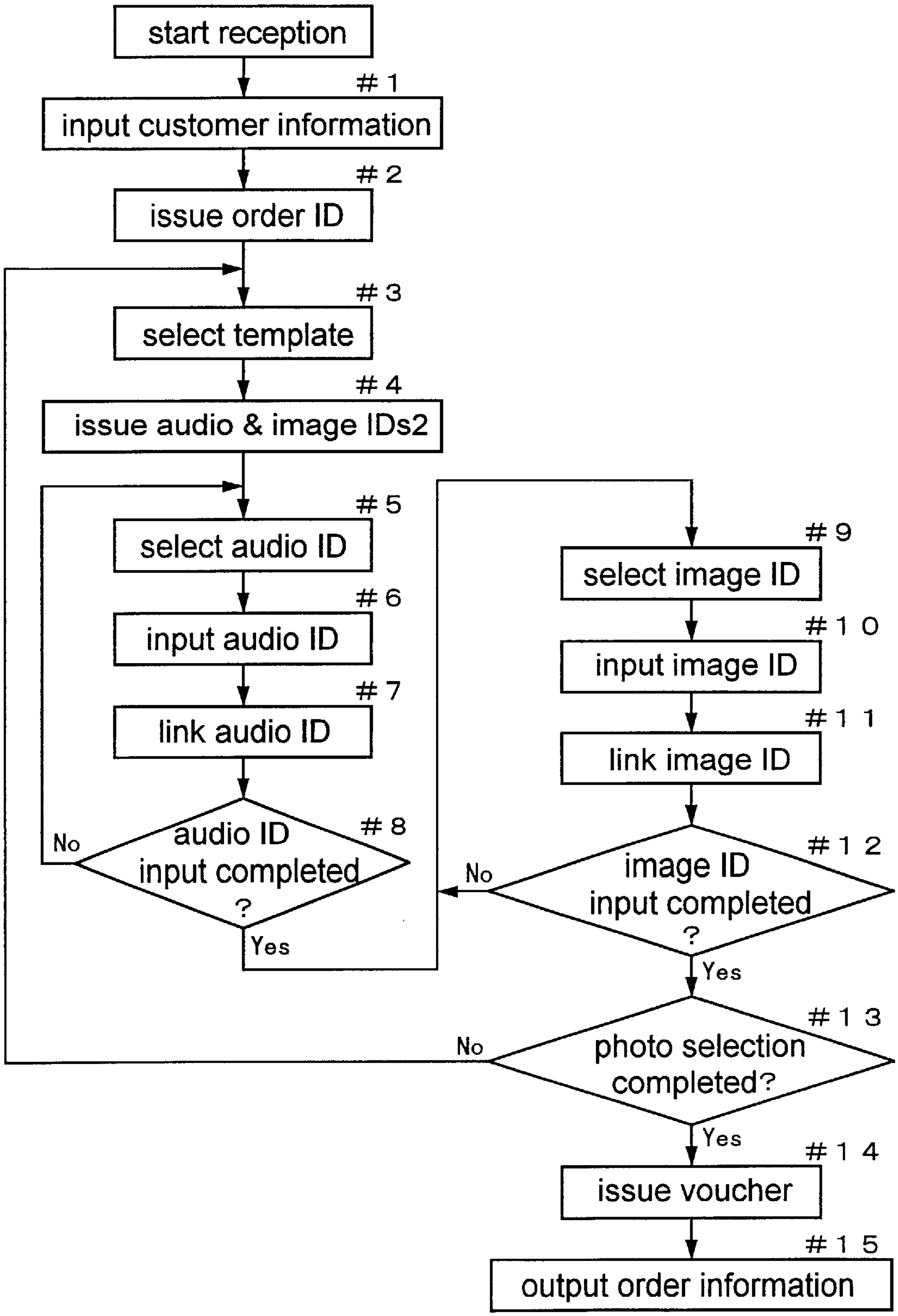
FIG. 6 is a flow chart showing a method of receiving an order for sound-accompanying photographs according to this invention.

A typical operating sequence of receiving an order for sound-accompanying photographs using the above receiving apparatus 1 will be described hereinafter with reference to FIG. 6. First, at step #1, customer information is inputted through the customer information input unit 21. The receptionist key-inputs information entered on an order sheet, along with order information, directly from the keyboard 27*a*. One example of order information inputted is shown in FIG. 2. Where the customer is recorded in the customer database, for example, basic information such as the name, address, telephone number, birthday and the number of visits so far made to the shop may be obtained on the basis of the customer ID. All the receptionist has to input in time of receiving the order is the customer ID. This requires a reduced inputting time.

At step #2, the ID generator 11 issues an order ID. The order ID issued is used for linkage to the audio information and image information inputted from the audio input unit 22 and image input unit 23. This order ID is an automatically incremented serial number.

At step #3, a template or templates to be used for the sound-accompanying photographs at this time is/are selected from the template storage 24. For selecting a desired template from the template storage 24, the customer may look at a pamphlet of numerous templates and select a template to be used. Alternatively, a template or templates may be selected from those stored on a CD-ROM and displayed on the monitor 27*b* by using a browser. When the pamphlet is used, the ID of a selected template is inputted from the keyboard 27*a*, whereby the template electronically stored on some storage medium is transmitted to the central control unit 10. When the CD-ROM is used, a desired template is selected on the screen of monitor 27*b* and a copy icon is clicked, whereby the pertinent template stored on the CD-ROM is supplied to the central control unit 10.

Figures 7, 8, 9:
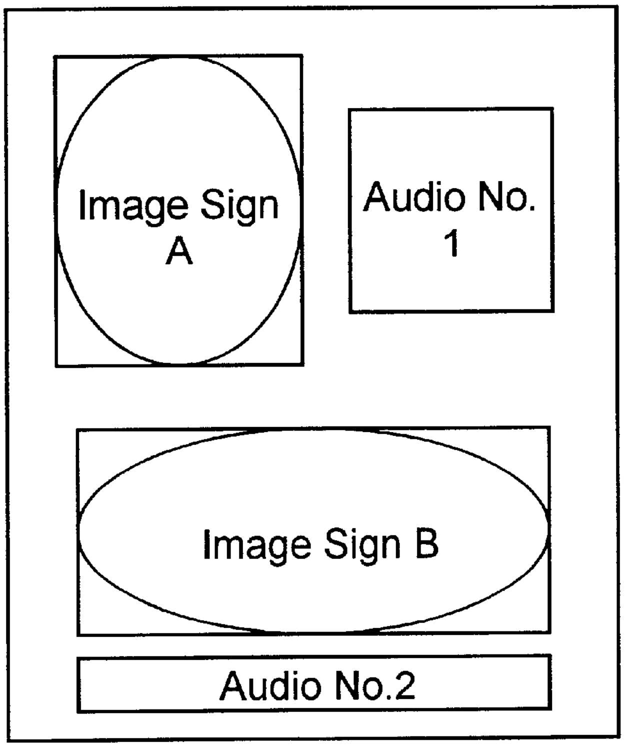
FIG. 7 is a schematic view showing data structures of an audio ID and an image ID.
FIG. 8 is a schematic view showing one example of templates.
FIG. 9 is a schematic view showing data structures of image data with an ID and audio data with an ID.

At step #4, the number of processes which increases with the number of sound-accompanying photographs ordered, and the ID(s) of the template or templates to be used, are applied to the ID generator 11, which issues IDs for the audio information and image information required by the order received at this time. Data structures of the audio ID and image ID are shown in FIG. 7. The template ID links design information defying the template design, and format information indicating the number, time, positions of sounds and the number and positions of images. The process ID identifies an individual sound-accompanying photograph in an order for plural types of sound-accompanying photographs. Where, for example, the order received is for two types of sound-accompanying photographs, process IDs "1" and "2" are issued. The audio number ID is used to link each audio recording region and audio information corresponding thereto where the layout of the template defined by the design information includes a plurality of audio recording regions. The image number ID is used to link each image recording region and image information corresponding thereto where the layout of the template defined by the design information includes a plurality of image recording regions.

Step #5 is executed to select one of the audio IDs issued that corresponds to the audio information to be inputted now through the audio input unit 22. This operation is performed, preferably, while looking at a layout screen displayed on the monitor 27*b* by the layout editor 12. One example of layout screens is shown in FIG. 8. Here, the block marked Audio No. 1 represents an audio recording region with which audio ID "1" is linked.

Step #6 is executed to input, through the audio input unit 22, the audio ID selected at step #5, and thus the audio information for the audio recording region linked to this audio ID. The volume of the audio information applied to the audio recording region has been determined in time of designating the template. Therefore, where the region size priority mode is set, only the audio information of a volume conformed to the region size is inputted, or a compression parameter suited to the region size is set for allocating excessive audio information. Where the audio quality priority mode is set, the audio recording region is enlarged if excessive audio information is inputted. For this purpose, the audio information inputted or to be inputted is applied to the audio volume calculator 13 for calculation of a size to be occupied by a code image converted from the audio information. The audio information inputted may be reproduced by the audio reproduction unit 25, and may be inputted again when necessary.

At step #7, the audio information inputted and the audio ID selected at step #5 are combined to produce audio information with ID. This data structure is shown in FIG. 9. As a result, the audio information inputted is linked to the audio recording region on the layout.

At step #8, the number of issued audio IDs remaining unlinked to audio information is checked to determine whether required audio information has been inputted. When the result is "No", the operation returns to step #5. When the result is "Yes", the operation proceeds to step #9.

Step #9 is executed to select one of the image IDs issued that corresponds to the image information to be inputted now through the image input unit 23. This operation may also be performed while looking at the layout screen displayed on the monitor 27*b* by the layout editor 12. On the layout screen shown in FIG. 8, the block marked Image Sign A represents an image recording region with which image ID "A" is linked.

Step #10 is executed to input, through the image input unit 23, the image information selected at step #9 for the image recording region. The volume of the image information applied to the image recording region has been determined in time of designating the template. Thus, as necessary, images are trimmed or changed in size in time of or after the input, scanning resolution is adjusted, and the resolution of inputted images is varied. An image quality priority mode or a region size priority mode may be set to carry out a similar process to that for inputting audio information.

At step #11, the image information inputted and the image. ID selected at step #9 are combined to produce image information with ID. This data structure is shown in FIG. 9. As a result, the image information inputted is linked to the image recording region on the layout. The image information inputted may be displayed on the monitor 27*b* at any time to facilitate confirmation.

At step #12, the number of issued image IDs remaining unlinked to image information is checked to determine whether required image information has been inputted. When the result is "No", the operation returns to step #9. When the result is "Yes", the operation proceeds to step #13.

Step #13 is executed to check whether all order receiving processes have been completed for the sound-accompanying photographs ordered at this time. When the result is "No", the operation returns to step #3. When the result is "Yes", the operation proceeds to step #14.

At step #14, the order information output unit 26 issues the voucher shown in FIG. 3, and the voucher is handed to the customer to complete the order receiving processes. The voucher has the above audio IDs and image IDs printed thereon. An identical voucher is issued and attached to a product packet as a customer collating order slip. Thus, when the product packet containing finished sound-accompanying photographs is handed to the customer, the voucher produced by the customer may be collated with the customer collating order slip attached to the product packet to confirm that the photographs belong to this customer. Further, when the agent receives a re-order for the same sound-accompanying photographs from the customer, it may be accepted only by confirming the customer collating order slip attached to the product packet. This saves the time taken for selecting the template.

Even if the order slip is attached to the product packet, the processing agent who has received the order cannot make sound-accompanying photographs based on the order slip attached to the product packet. At that time, a further identical voucher is issued for the operator who will make sound-accompanying photographs. The operator makes sound-accompanying photographs based on this operator's voucher, and returns finished sound-accompanying photographs with the operator's voucher to the agent. The agent collates the operator's voucher returned with the finished photographs, with the customer collating order slip attached to the product packet, to confirm whether the sound-accompanying photographs have been made as requested. The sound-accompanying photographs are correctly put into the product packet of the customer who has placed the order.

At step #15, the order information output unit 26 outputs order information including all information necessary for producing sound-accompanying photographs, as a file written in the page description language.

Figure 10:
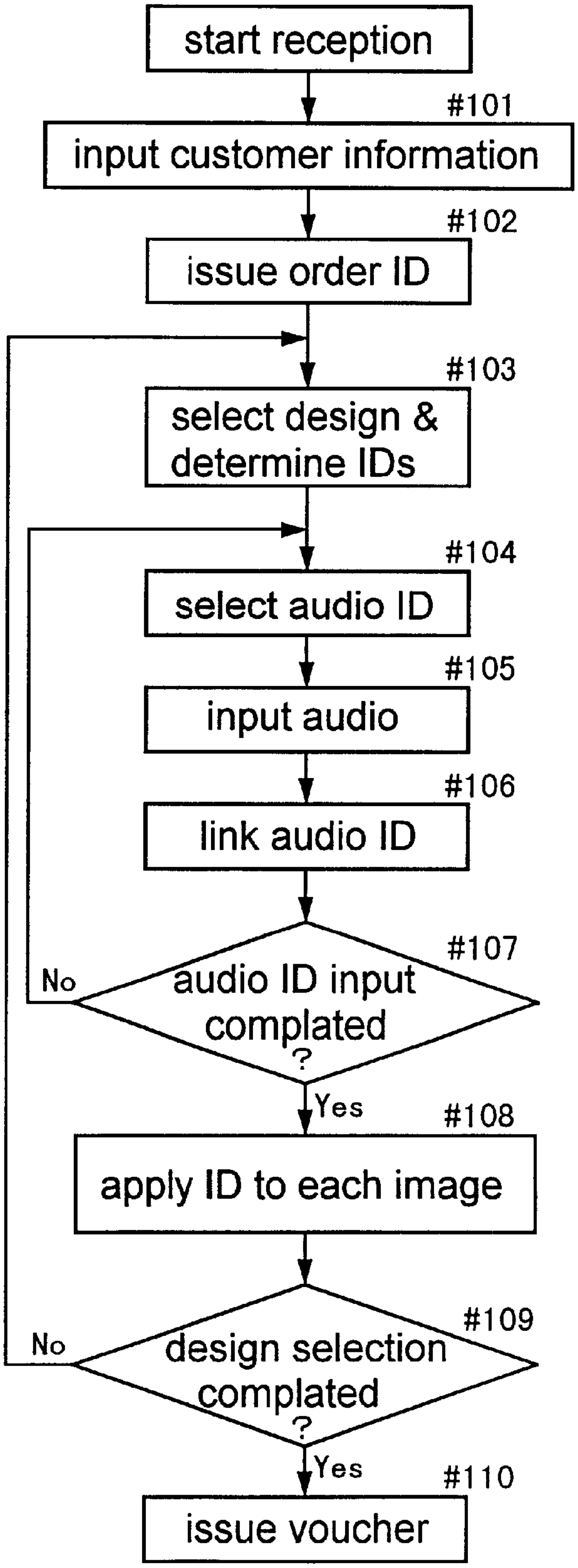
FIG. 10 is a flow chart showing another method of receiving an order for sound-accompanying photographs according to this invention.

Next, another typical operating sequence of receiving an order for sound-accompanying photographs will be described with reference to FIG. 10. In this example, image information is limited to images on photographic film or printed images. The image information is not inputted to the receiving apparatus 1, but the photographic film or the like is joined as it is with an order slip issued by the order information output unit 26. Naturally, the receiving apparatus 1 used in this case does not require the image input unit 23.

At step #101, customer information as shown in FIG. 2 is entered on a predetermined order form or in an order column printed directly on a product packet.

At step #102, the ID generator 11 issues an order ID when the order is made definite by filling an order number for this customer or using a check label as conventionally used by the processing agent. This order ID is used for linkage to audio information and image information received from the customer at subsequent steps.

Figure 11:
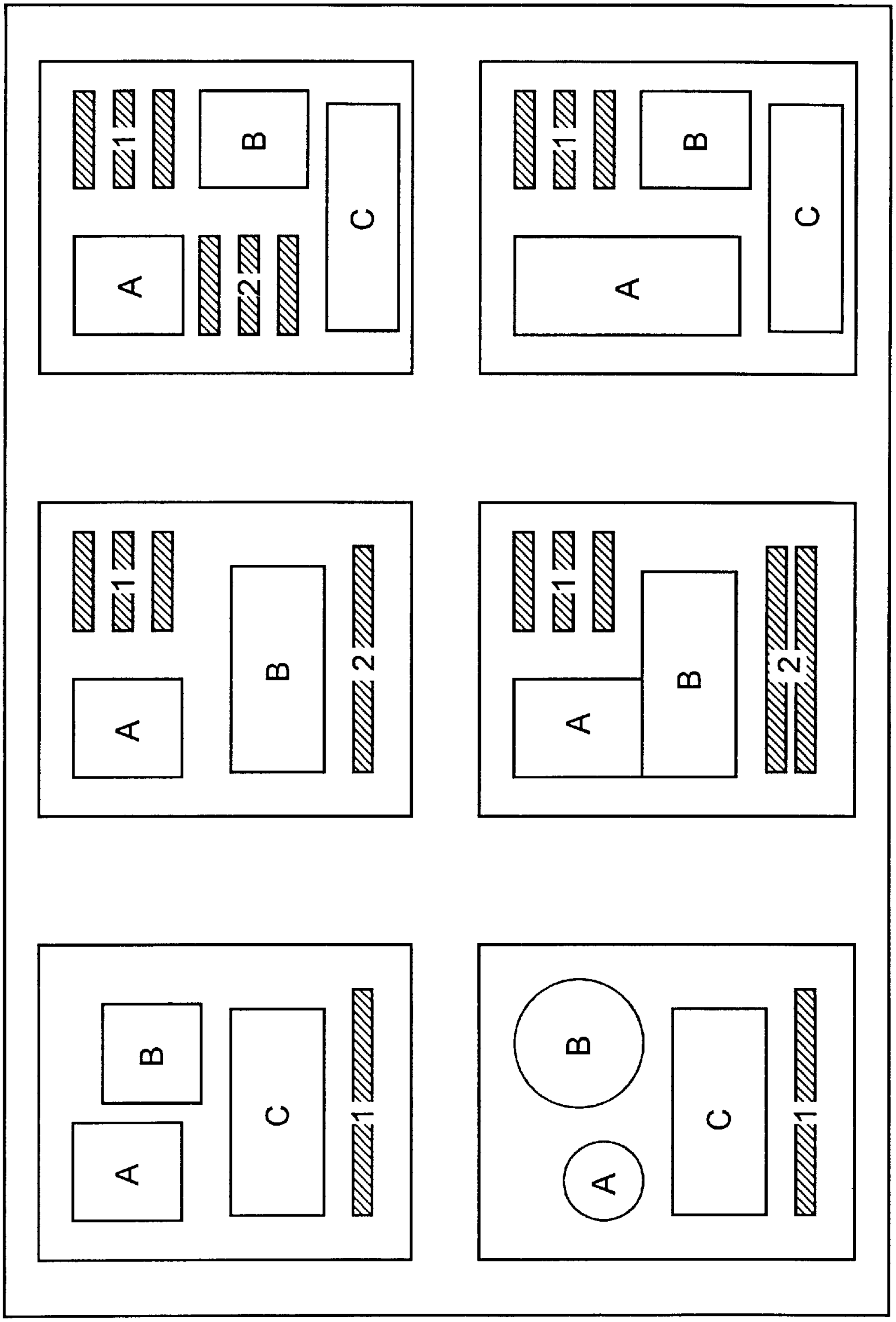
FIG. 11 is an explanatory view showing one example of pamphlets of a template collection.

At step #103, the customer looks at a pamphlet which is a collection of templates and selects a template to be used. The pamphlet may be separate from the order form as shown in FIG. 11, or may be integrated therewith as shown in FIG. 12. By filling in the ID of a selected template on the order sheet, the number of audio information and image information required is established, and an ID is issued for each. As a result, IDs necessary for making one sound-accompanying photograph are obtained. Step #104 is executed to select one of the audio IDs issued that corresponds to the audio information to be inputted now through the audio input unit 22.

Step #105 is executed to input, through the audio input unit 22, the audio ID selected at step #104, and thus the audio information for the audio recording region related to this audio ID. The volume of the audio information applied to the audio recording region has been determined in time of designating the template. Here too is inputted only the audio information of a volume conformed to the size calculated by the audio volume calculator 13 as a region the audio information occupies when made into a code image, or a compression parameter suited to the region size is set for allocating excessive audio information. The audio information inputted may be reproduced by the audio reproduction unit 25, and may be inputted again when necessary.

At step #106, the audio information inputted and the audio ID selected at step #104 are combined to produce audio information with ID. This data structure is the same as that shown in FIG. 9. As a result, the audio information inputted is linked to the audio recording region on the layout. This audio information with ID is outputted from the order information output unit 26 to a suitable recording medium. At the same time, the content of the audio information is entered in an audio information column of an order form.

Step #107 is executed to check whether required audio information has been inputted. When the result is "No", the operation returns to step #104. When the result is "Yes", the operation proceeds to step #108.

At step #108, image IDs are applied to desired image information on the image original such as a photographic film brought in by the customer. In the case of a photographic film, image frame numbers may be used as image IDs. The pamphlet is shown to the customer for confirmation of image recording positions. The image frame numbers are entered in a column of image recording positions (marked A, B and C) on the order form. IDs (which are image frame numbers here) are applied to the column of image recording positions.

Step #109 is executed to check whether all receiving processes have been completed for the sound-accompanying photographs ordered at this time. When the result is "No", the operation returns to step #103. When the result is "Yes", the operation proceeds to step #110.

At step #110, the order information output unit 26 issues a voucher which is handed to the customer to complete the receiving processes.

Figure 13:
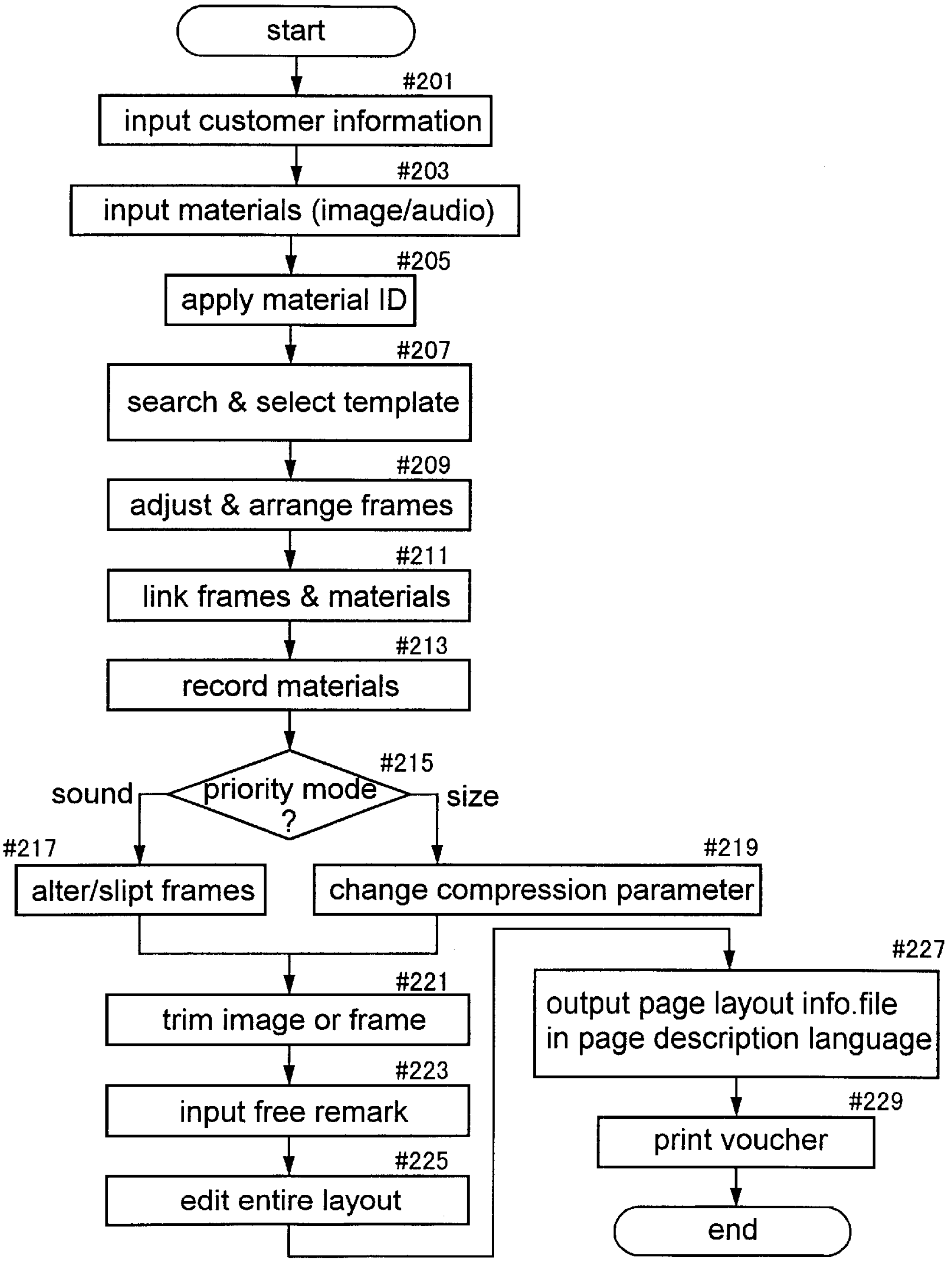
FIG. 13 is a flow chart showing a further method of receiving an order for sound-accompanying photographs according to this invention.

Next, a different reception system having a general-purpose computer acting as the core thereof, and additionally including a necessary audio input device and image input device, will be described with reference to the flow chart shown in FIG. 13. The computer has, installed therein, a program for receiving orders for sound-accompanying photographs, which is similar to DTP (desktop publishing) software. This program may be considered as a page layout program for handling a virtual page corresponding to each sound-accompanying photograph, with the addition of a function to handle data regarding reception such as customer information.

First, at step #201, customer information as shown in FIG. 2 is inputted by means of a card or through the keyboard. This starts a page layout operation which regards a finished sound-accompanying photograph as one page.

At step #203, materials used on this page, i.e. image information and audio information, are inputted through various input devices. When the customer brings only image information such as negative film, appropriate audio information may be retrieved from a collection of audio materials in the form of a database. When the customer brings only audio information such as recorded tape, appropriate image information may be retrieved from a collection of image materials in the form of a database. Of course, both audio and image information may be extracted from the material collections.

At step #205, interim identification signs, e.g. file names, are applied to the information taken into the computer system at step #203, so that different information may be distinguished. These file names are registered in a material library and displayed in a material window on the monitor screen with thumbnails. An image may be enlarged on the screen by clicking a mouse on a thumbnail. Sound is produced from a loudspeaker. Thus, the information may be confirmed easily.

At step #207, at the request of the customer, a search is made through templates each having at least one image recording region (which will be referred to hereinafter simply as an image frame) and at least one audio recording region (which will be referred to hereinafter simply as an audio frame). A desired template is selected and displayed on the monitor screen. A photo size, i.e. a page size, is set at this time.

At step #209, when the customer desires to change the sizes and positions of the image frame and audio frame in the template displayed on the screen, this may be carried out simply by using the mouse in a way to work on usual graphic software. When the customer desires to add frames, new frames of selected sizes may be created by using an audio or image frame creating tool.

At step #211, audio information selected in the material window is linked to a selected audio frame, and image information selected in the material window to a selected image frame. This operation is repeated to link appropriate information to all frames on the page. The sound ID and image ID noted hereinbefore are issued at this stage.

At step #213, the information is recorded in the frames linked therewith. At this stage, the operation may return to step #203 to adopt new materials and change linkage.

At step #215, the audio quality priority mode or region size priority mode is confirmed or selected. When priority is given to audio quality, step #217 is executed to change the size of the audio frame based on the size of the audio frame calculated from the audio information applied thereto. At this time, the audio frame may be split into a plurality of frames as necessary. In the region size priority mode, step #219 is executed to set a compression parameter matched to the size of the audio frame.

At step #221, the image or frame is trimmed when the size of the image applied deviates from the frame size.

At step #223, a free remark, i.e. text, is inputted if the customer so desires. A font type, font size and position of the text inputted are selected on the monitor screen by using the mouse.

At step #225, the layout of the entire page is checked and a final proofreading is carried out. If anything is found unsatisfactory, the operation returns to an appropriate step to carry out the processes all over again.

At step #227, layout information on this page including the customer and order information is outputted as completed order information for a sound-accompanying photograph in the form of a file written in the page description language. Where this page description language can handle audio data or data made into a code image, the audio data also is stored in this file along with the image data. Normally, image information and audio information are outputted as separate source files accessible to a layout information file, or are transmitted to a photo processing site in the original forms brought in by the customer.

At step #229, a voucher as shown in FIG. 3 is printed out and given to the customer.

What is claimed is:

1. An order receiving method for making sound-accompanying photographs having image information, and audio information converted into code images to be optically readable, said image information and said audio information being recorded, as an image, on one surface of a recording sheet, said method comprising the steps of:

receiving image information and audio information from a customer;

applying an image identification sign to said image information and applying an audio identification sign to said audio information;

selecting a template providing an image recording region and an audio recording region for recording said image information and said audio information respectively, on said one surface of said recording sheet;

linking said image identification sign with said image recording region and linking said audio identification sign with said audio recording region; and outputting, as sound-accompanying photograph order information, said template having said image identification sign and said audio identification sign linked thereto.

2. A method as defined in claim 1, wherein an image region identification sign is determined beforehand in said image recording region, and an audio region identification sign is determined beforehand in said audio recording region, and wherein said image identification sign is linked with said image region identification sign, and said audio identification sign is linked with said audio region identification sign.

3. A method as defined in claim 1, wherein said order information is recorded on a voucher in a form readable by an optical reader.

4. An order receiving apparatus for making sound-accompanying photographs having image information, and audio information converted into code images to be optically readable, said image information and said audio information being recorded, as an image, on one surface of a recording sheet, said apparatus comprising:

receiving means for receiving image information and audio information from a customer, and applying an image identification sign to said image information and applying an audio identification sign to said audio information;

a template library storing a plurality of templates, each said template providing an image recording region and an audio recording region for recording said image information and said audio information respectively, on said one surface of said recording sheet;

recording region designating means for linking said image identification sign with said image recording region and linking said audio identification sign with said audio recording region on a template selected from said template library; and order information registering means for outputting said template as sound-accompanying photograph order information, said template having said image identification sign and said audio identification sign linked thereto.

5. An apparatus as defined in claim 4, wherein an image region identification sign is determined beforehand and an audio region identification sign is determined beforehand in said audio recording region, and wherein said recording region designating means links said image identification sign with image region identification sign, and links said audio identification sign with said audio region identification sign.

6. An apparatus as defined in claim 5, further comprising a voucher output unit for outputting, as a voucher, said order information in a form readable by an optical reader.

7. An order receiving apparatus for making sound-accompanying photographs having image information, and audio information converted into code images to be optically readable, said image information and said audio information being recorded, as an image, on one surface of a recording sheet, said apparatus comprising:

receiving means for receiving image information and audio information from a customer, and applying an image identification sign to said image information and applying an audio identification sign to said audio information;

a template library storing a plurality of templates, each said template providing an image recording region and an audio recording region for recording said image information and said audio information, respectively, on said one surface of said recording sheet; layout edit means for linking said image identification sign with said image recording region and linking said audio identification sign with said audio recording region on a template selected from said template library; and order information output unit for outputting order information by using a source mixed type page description language, said order information including said image information and said audio information per se, and layout information indicative of a layout edited by said layout edit means.

8. An apparatus as defined in claim 7, wherein said layout edit means has a region size priority mode for setting a compression parameter for use in converting said audio information into a code image to fit into a size of the audio recording region, and an audio quality priority mode for adjusting said audio recording region to accommodate a volume of said audio information converted into said code image.

9. An apparatus as defined in claim 8, wherein said layout edit means includes an audio volume calculating unit for calculating said volume of said audio information converted into said code image, and recording region altering unit for altering said audio recording region according to said volume calculated.

10. An apparatus as defined in claim 9, wherein said recording region altering unit has a function to split said audio recording region into a plurality of stages.

11. An apparatus as defined in claim 7, wherein said layout edit means includes an attribute value setting unit for setting attribute values to said audio recording region for making said sound-accompanying photograph.

12. An apparatus as defined in claim 7, wherein said order information output unit is operable to output said order information separately from said image information and said audio information by using a markup type page description language.

13. An apparatus as defined in claim 7, wherein said order information output unit is operable to output said order information, said image information and said audio information to media.

14. An order receiving method for making, by using a computer system, order information relating to an order for sound-accompanying photographs having image information, and audio information converted into code images to be optically readable, said image information and said audio information being recorded, as an image, on one surface of a recording sheet, said method comprising the steps of:

receiving image information and audio information from a customer, and applying an image identification sign to said image information and applying an audio identification sign to said audio information;

selecting, from a template library, a template providing an image recording region and an audio recording region for recording said image information and said audio information, respectively, on said one surface of said recording sheet;

linking said image identification sign with said image recording region and linking said audio identification sign with said audio recording region on said template selected from said template library;

applying provisionally said image information and said audio information to said image recording region and said audio recording region, respectively, with using said image identification sign and said audio identification sign;

adjusting a volume of said information applied and/or a size of said recording regions linked, when said information applied disagrees with the size of said recording regions; and outputting a completed page design as said order information by using a page description language.

15. A method as defined in claim 14, wherein said order information outputted includes a compression parameter for use in converting said audio information into a code image.

16. A method as defined in claim 14, wherein said recording regions are selected and set by accessing a template library storing a plurality of templates providing designs and arrangements of said recording regions.

* * * * *